United States Patent [19]

Reynolds

[11] Patent Number: 4,907,540
[45] Date of Patent: Mar. 13, 1990

[54] APPARATUS AND METHOD FOR REMOVING CAT HAIR

[76] Inventor: Evan B. Reynolds, 6691 Smokewood Cir., Anaheim Hills, Calif. 92807

[21] Appl. No.: 93,751

[22] Filed: Sep. 8, 1987

[51] Int. Cl.⁴ .............................................. A01K 13/00
[52] U.S. Cl. ...................................... 119/86; 119/157; 119/83; 15/160
[58] Field of Search ...................... 119/83, 86; 40/209

[56] References Cited

U.S. PATENT DOCUMENTS 2,935,281  5/1960  Huffman ................................ 40/209
3,312,010  4/1967  Bartolone ............................... 40/209
4,747,371  5/1988  Leopold .................................. 119/83

OTHER PUBLICATIONS

Parade Magazine, The Washington Post (Jul. 26, 1987) advertisement: Mr. Spats' Amazing New Catacomb.

Primary Examiner—Gene Mancene
Assistant Examiner—R. Thomas Price
Attorney, Agent, or Firm—Lynn & Lynn

[57] ABSTRACT

A device for safe and convenient removal of loose hair and fur balls from a cat having a frame mounted to a wall. Attached to the frame are two planar surfaces upon which are placed catnip receptacles and a plurality of bristles. The plurality of bristles are of appropriate number, placement, and size to catch and hold a cat's loose fur. The receptacles of catnip serve to lure the cat to the device so the cat is likely to scratch itself on the bristles.

9 Claims, 3 Drawing Sheets

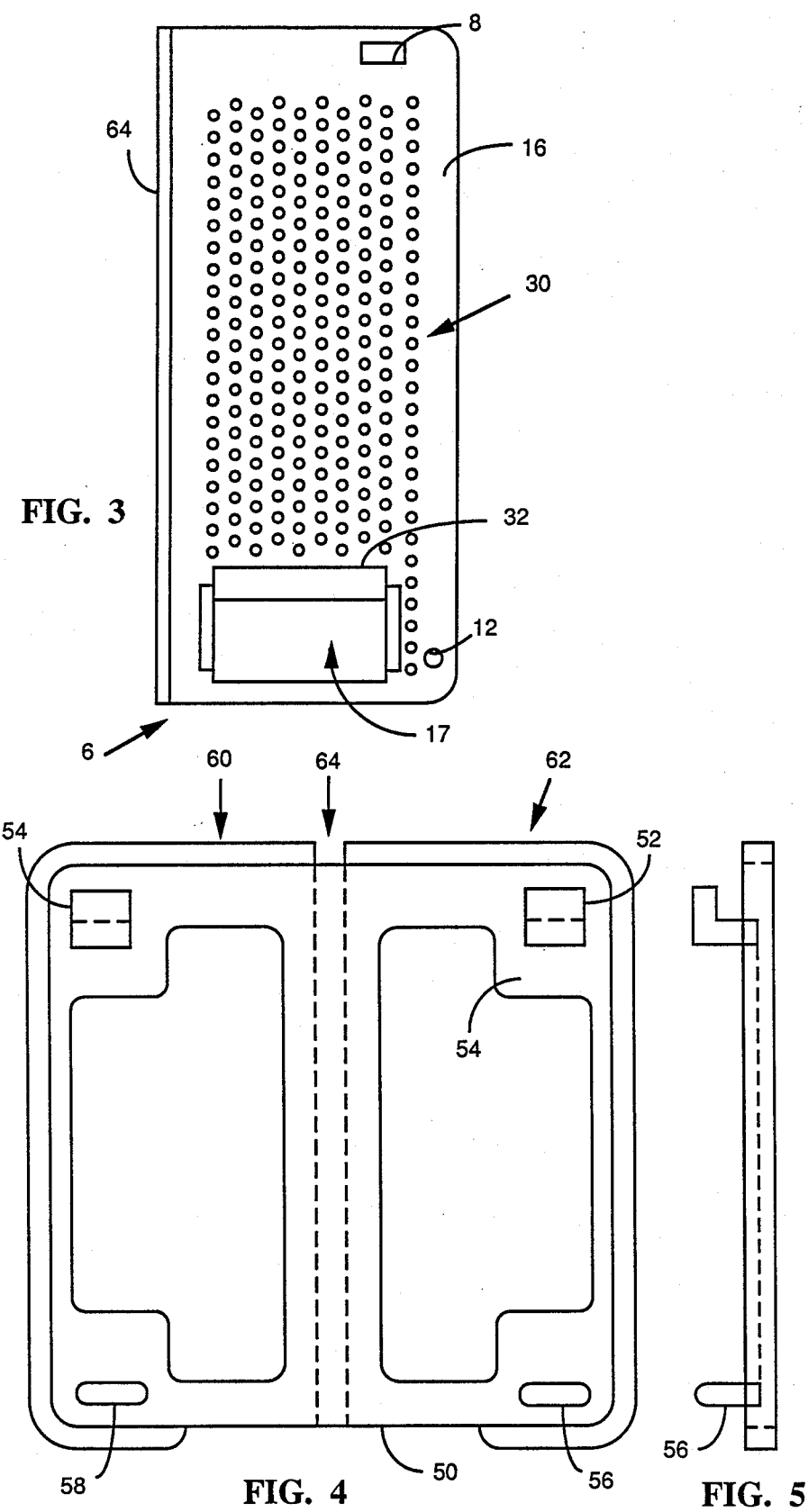

APPARATUS AND METHOD FOR REMOVING CAT HAIR

BACKGROUND OF THE INVENTION

This invention relates generally to a brush to remove hair from a cat. More specifically it relates to a stationary brush upon which a cat voluntarily grooms itself, depositing its loose hair onto the bristles of the brush.

As the modern generation has progressed and the cat has replaced the dog as the most popular house pet, attention must be drawn to the refuse left behind by the animal. One element of refuse left behind by a cat is the hair naturally shed by the animal. Cat hair can find its way onto upholstery, both household and automobile, into the bathroom, kitchen, and other living quarters. It is unpleasant to touch, unsightly and provides an environment for the growth of bacteria.

One element that has led to the cat replacing the dog in popularity is the fact that cats need less attention, and, therefore, the time required to care for them is less. It would be of great assistance to cat owners to have a device which would cause a cat voluntarily to groom away its loose hairs and leave them in a small area.

SUMMARY OF THE INVENTION

The present invention provides a stationary wall mounted device for removing cat hair. The device has a plurality of bristles which form a brushlike pattern. The bristles are of an appropriate hardness and thickness to catch and hold loose cat hairs. The device comes in a mounting bracket and may be attached to a flat wall or any exposed corner (~270°), a natural place for a cat to scratch itself.

In addition to convenient placement the present invention provides catnip and catnip storage receptacles to attract felines to the brush.

BRIEF DESCRIPTION OF DRAWINGS

FIG. 3 is an elevation view showing half of the brush of FIG. 1.

FIG. 4 is a front elevation view of the wall mounting bracket of FIG. 2.

FIG. 5 is a side elevation view of the wall mounting bracket of FIGS. 2 and 4.

DESCRIPTION OF THE PREFERRED EMBODIMENT

Figure 1:
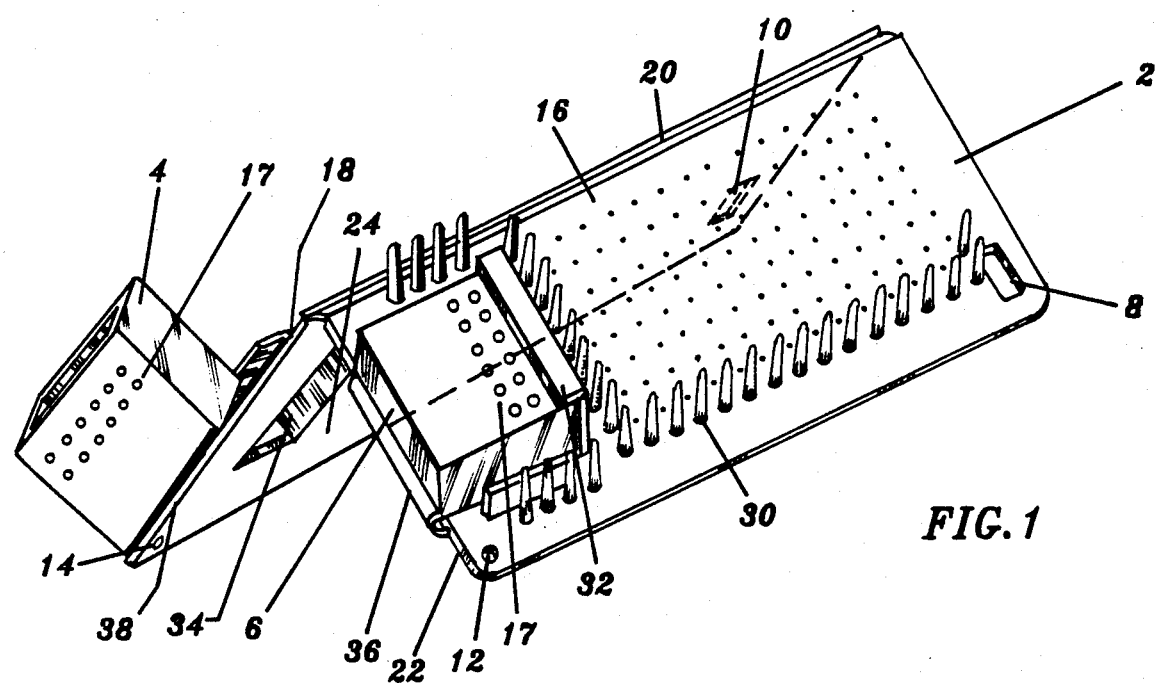
FIG. 1 is a perspective view of the brush and catnip receptacle structures of the present invention.
Figure 2:
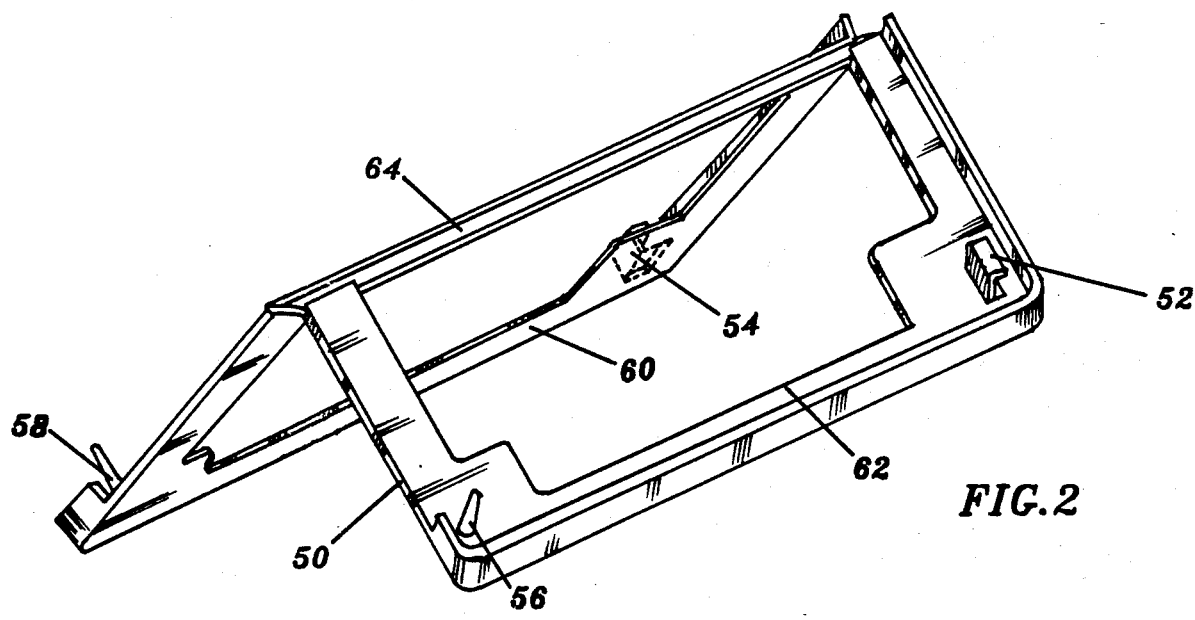
FIG. 2 is a perspective view of the wall mounting bracket of the present invention.

FIGS. 1 and 2 show a brush structure 2 of the present invention and a pair of receptacles 4 and 6 into which catnip may be placed. The catnip is used to attract the cat to the brush structure 2. The structure of FIG. 1 fits into the stationary wall mount 50 of FIG. 2. The brush structure 2 has two holes 8 and 10 at the top near each corner. The holes 8 and 10 slip over clip-on brackets 52 and 54 (FIG. 2) located on the top two corners of the wall mount bracket. The lower two corners of the brush structure 2 have holes 12 and 14 which slip over fasteners 56 and 58 projecting from the wall mount 50.

The brush structure 2 is comprised primarily of two planar surfaces 16 and 18. These surfaces are attached in the middle by a thin plastic strip 20 or other similar flexible material. The plastic strip 20 serves as a hinge and allows the angle between the mounting sides of the planar surfaces 22 and 24 to range between 0° and slightly over 180°.

The exposed side of each planar surface 16 and 18 is covered with a plurality of brush bristles 30. The bristles 30 may be arranged in a pattern so that they occupy a pattern of columns and rows across the exposed face of the planar surfaces 16 and 18. As shown in FIG. 3, alternating rows of the bristles are offset from each other so that every other row has an essentially identical pattern of bristles. The pattern of dots in FIG. 1 on planar surface 16, illustrates where the bristles 30 would be located if they were arranged so that all of the rows were aligned identically. The bristles 30 in FIG. 1 are represented by circles in FIG. 3. Most of the bristles 30 were omitted from FIG. 1 for clarity and simplicity in illustrating the invention. The bristles are made of an appropriate hardness and thickness to catch and hold loose cat hairs and fur balls.

Referring to FIG. 1, at the bottom of the brush structure 2 are two catnip receptacles 4 and 6. The receptacles 4 and 6 are adjacent the two exposed planar surfaces 16 and 18, respectively. A plurality of small holes 17 are formed in the receptacles 4 and 6 to let the odor of the catnip emanate out to attract the cat. A pair of plastic clips 32 and 34 hold the catnip receptacles 4 and 6 closed at the top. Thin plastic hinges 36 and 38 at the bottom connect the receptacles to the surfaces 16 and 18. This structure allows easy access to the receptacles 4 and 6 for refilling or cleaning. Pulling up on the clips 32 and 34 allows the receptacles to open rotate outward on the hinges 36 and 38. The receptacles 4 and 6 open outward so that the catnip may be replaced or replenished without removing the brush 2 from the bracket 50.

Referring to FIGS. 2 and 4, the wall mounting bracket 50 preferably is made of the same material as the brush structure 2. The brush structure attaches to the wall mounting racket by slipping the holes 8 and 10 over the bracket clips 52 and 54 and by snapping snap fasteners 56 and 58 into holes 12 and 14. The bracket 50 is divided into two sections 60 and 62 that preferably are joined by a thin layer of plastic which operates as a hinge 64. The sections 60 and 62 may be moved through the same range as the brush structure 2, i.e. between 0° to slightly over 180°. The wall bracket 50 may be mounted to a wall with adhesive tape, screws, or any other fastening means such as hook and loop tape.

The two component construction of the wall mounting bracket 50 and brush structure 2 allows the brush structure 2 to be easily removed, cleaned and reinserted in the wall mounting bracket 50. The two part construction also allows the consumer to replace a brush structure 2 without having to purchase another wall mounting bracket 50.

What is claimed is:

1. An apparatus for eliminating loose hair from an animal such as a cat or the like, comprising:
   a first plate formed to include a plurality of bristles extending therefrom for removing loose hair from the animal; and
   a second plate connected to the first plate and forming a mounting bracket for fastening the first plate to an object such as a wall or the like so that the bristles are easily accessible to the animal.

2. The apparatus of claim 1 wherein the first plate further comprising:
   first and second planar surfaces;

a plurality of bristles mounted on each planar surface; and hinge means for connecting the first and second planar surfaces together allowing the first and second planar surfaces to be placed at a selected angle in relation to one another.

3. The apparatus of claim 2 wherein the plurality of bristles are made to have an appropriate length, thickness and hardness to catch and hold loose hair and fur balls deposited by cats who rub against the hair removing means.

4. The apparatus of claim 3 further comprising a receptacle for holding catnip hingedly mounted on one side to one of the first and second planar surfaces on the same side as the bristles and a clip that may be selectively engaged and disengaged with another side of the receptacle so that the receptacle may be rotated outward from the surface to which it is mounted without removing the brush from the bracket.

5. The apparatus of claim 1 wherein the first and second plates are generally rectangular, further comprising:
   a pair of hooks formed on the second plate near each of a pair of adjacent corners thereof;
   a pair of projections extending from the second plate near a second pair of adjacent corners thereof, the first plate including a first pair of holes therein configured to receive the hooks therein including a second pair of holes therein configured to register with the projections and snap fit therewith to secure the first and second plates together.

6. A method for eliminating loose hair from an animal such as a cat or the like, comprising the steps of:
   forming a first plate to include a plurality of bristles extending therefrom for removing loose hair from the animal; and
   providing a second plate to be connected to the first plate and forming a mounting bracket for fastening the first plate to an object such as a wall or the like so that the bristles are easily accessible to the animal.

7. The method of claim 6 further comprising the steps of:
   forming the first plate to have first and second planar surfaces, each planar surface having a plurality of bristles thereon; and
   connecting the first and second planar surfaces together with a hinge between edges of the surfaces to allow the surfaces to be placed at a selected angle in relation to one another.

8. The method of claim 7 including the step of providing a catnip holding receptacle connected to one of the planar surfaces through a hinge on one side and a clip on the other so that the receptacle rotates out from the planar surface to provide access to the receptacle without removing the brush from the wall.

9. The method of claim 6, including the steps of:
   forming the first and second plates to be generally rectangular;
   forming a pair of hooks on the second plate near each of a pair of adjacent corners thereof;
   forming a pair of projections extending from the second plate near a second pair of adjacent corners thereof;
   forming a first pair of holes in the first plate to receive the hooks therein; and
   forming a second pair of holes in the first plate to register with the projections and snap fit with to secure the first and second plates together.

* * * * *